Nov. 5, 1957   J. N. BETHUNE   2,812,119
PRESSURE RESPONSIVE AUTOMATIC DISPENSING DEVICE
Filed Sept. 20, 1954

INVENTOR.
JAMES N. BETHUNE
BY
ATTORNEY.

United States Patent Office 2,812,119
Patented Nov. 5, 1957

2,812,119

PRESSURE RESPONSIVE AUTOMATIC DISPENSING DEVICE

James N. Bethune, Arcadia, Calif.

Application September 20, 1954, Serial No. 457,019

3 Claims. (Cl. 222—394)

This invention relates to an automatic dispensing device for liquid solutions, and more particularly to a dispensing device for automatically introducing a selected amount of sanitizing solution, deodorizing solution and the like, into a water closet in response to changes in the water level in the flush tank caused by flushing thereof.

It is understood that this dispensing device may be utilized in other installations wherever there may be an intermittent fluctuation of pressure in a fluid, said pressure fluctuation actuating the device of this invention.

Prior proposed automatic dispensing devices for introducing sanitizing solutions into a water closet have comprised complicated apparatus including valves, moving parts and various arrangements of liquid-holding receptacles. Such prior proposed devices required constant maintenance and service because of the moving parts which soon became corroded or coated with scale, deposits, and the like resulting from contact with the water. As a result, automatic operation soon terminated and repairs or cleaning of the parts were required. Such prior proposed devices were also very expensive to manufacture and their cost was prohibitive for a normal residential installation of a water closet.

The primary object of this invention is to disclose and provide an automatic dispenser for selected solutions which obviates the disadvantages of the prior proposed devices and which is substantially foolproof in operation.

An object of this invention is to disclose and provide an automatic dispensing device for selected solutions in response to change in liquid level in an associated receptacle, said device not including any moving parts and being of very simple construction and design.

Another object of this invention is to disclose and provide an automatic dispensing device for a sanitizing solution for water closets wherein a selected amount of solution is dispensed each time the water closet is flushed.

A further object of this invention is to disclose and provide an automatic dispensing apparatus responsive to changes of liquid level in a receptacle associated with the device wherein means are provided for supplying and maintaining a selected level of dispensing solution in the device so that the device may be operable for long periods of time without attention.

This invention contemplates such an automatic dispensing device including a minimum of parts which are simply, inexpensively and easily constructed and assembled.

This invention contemplates such an apparatus for automatically dispensing a sanitizing solution wherein tube means are provided for passageway of solution to an outlet in communication with the liquid in the receptacle to be sanitized and wherein said tube means is provided with means for preventing siphoning of the solution into the liquid.

Generally speaking, this invention contemplates a container means for the solution to be dispensed which may be mounted within a flush tank of a water closet. Associated with the container means is a pressure chamber which is adapted to trap and compress air upon rise of liquid in the flush tank after the flushing operation. A tube means is in communication with the pressure chamber and is provided with an inlet port immersed in the solution to admit solution to the tube means. The tube means is also provided with a dispensing chamber provided with an outlet port. Change in the level of the liquid in the flush tank compresses air in the pressure chamber, said pressure being transmitted through the tube means to the solution therein for moving said solution to the dispensing chamber for introduction to the liquid in the water closet. Anti-siphon means are provided in the tube means so that the solution will not be completely discharged upon flushing of the water closet.

Other objects and advantages of this invention will be readily apparent from the following description of the drawings in which an exemplary embodiment of this invention is shown.

Figure 1:
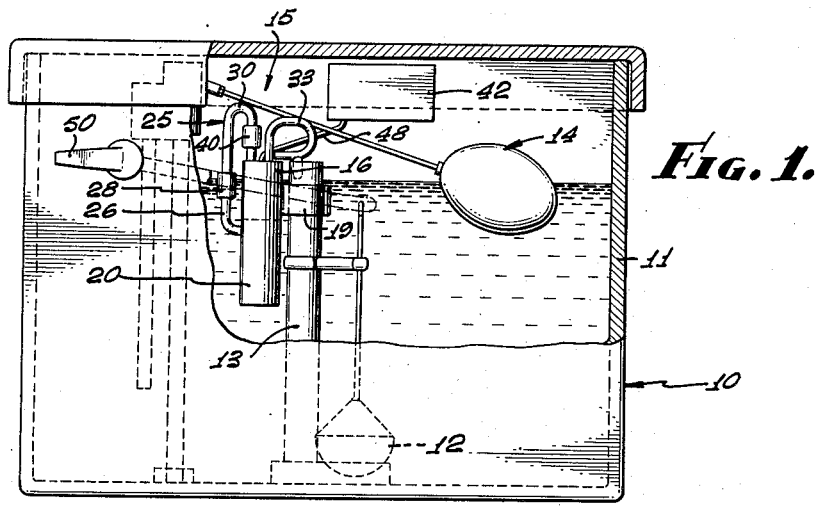
Fig. 1 is an elevational view of a flush tank of a water closet, part of the front wall of said tank being broken away to show an embodiment of this invention installed within said tank.
Figure 2:
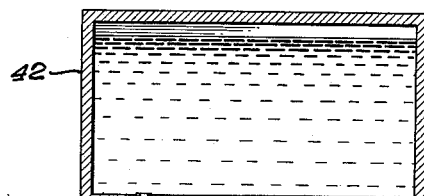
Fig. 2 is an enlarged elevational view partly in section of the device shown in Fig. 1, the section being taken in a vertical plane bisecting parts of the device.

In Fig. 1 is shown the flush tank 10 of a water closet including a toilet bowl, not shown. The flush tank 10 comprises a suitable receptacle 11 for holding a selected quantity of water for flushing through a discharge valve assembly generally indicated at 12. Within the receptacle 11 is provided an overflow stack or pipe 13. A float valve means 14 is connected to an inlet water pipe (not shown). The parts of the flush tank are well known and are only briefly described because they are not part of this invention.

The automatic dispensing device of this invention is generally indicated at 15. In this exemplary installation, the device 15 includes a container means 16 for holding a solution to be dispensed within the receptacle 11. The container means 16 may be provided with a suitable clamp 19 for attaching the container means 16 to the overflow pipe 13. As illustrated, the clamp 19 may be bonded to or welded to the container 16 and may resiliently grip the pipe. It is understood that any other suitable clamping means may be employed.

The container means 16 in this example provides a chamber 17 for holding a selected solution to be dispensed. The container means 16 is provided with a top opening 18 which is positioned above the topmost level of liquid held by receptacle 11.

In this example, the container means 16 is cylindrical and is integral with a downwardly directed cylindrical extension 20 having a bottom opening 21. The cylindrical extension 20 provides a pressure chamber 22 which is separated from the solution chamber 17 by a partition wall 23 provided intermediate the ends of the container means 16 and its integral extension 20. While the container means has been illustrated as being integrally formed with the partition wall 23, it will be understood that the container means including the solution chamber 17 may be separate from the cylindrical extension 20 and the pressure chamber provided thereby. The pressure chamber 22 may serve its function in the device of this invention when separated and spaced from the solution chamber 17. It need not be positioned adjacent to the overflow stack 13. However, the above construction simplifies making of this device, substantially reduces the number of parts, and provides a compact assembly.

The container means 16 and its extension 20 may be made of any suitable material, preferably a plastic composition material which will resist corrosion, accumulation of scale and the like caused by immersion in water.

Tube means generally indicated at 25 serves to provide a continuous passageway from the pressure chamber 22, to the solution chamber 17, and to the overflow stack 13 whereby solution in chamber 17 may be introduced into the overflow stack and into the toilet bowl. The tube means 25 may be made of a similar plastic composition material as the container means 16 and is non-corrosive, non-scaling, and unaffected by action of the water.

The tube means 25 includes a connector fitting 26 at the inlet end thereof, said fitting 26 providing an inlet opening 27 in communication with the top of pressure chamber 20. The fitting may be secured as by bonding or cementing in the wall of the cylindrical extension 20. The upper end of the fitting 26 is provided with a socket 28 which receives therewithin the end portion 29 of a continuous bent tube 30. The socket 28 provides a convenient means for releasably interconnecting tube 30 with connector fitting 26 so that tube 30 may be readily disassembled without disturbing the connection with the cylindrical extension 20.

The tube 30 extends upwardly above the top of container means 16 and is then bent downwardly to provide an intermediate U-portion 31 which extends into solution chamber 17 in spaced relation to partition wall 23. The lowermost wall of the intermediate U-shaped portion 31 is provided with a relatively small port or orifice 32 for admitting solution into portion 31. Obviously solution admitted through port 32 will rise in the leg sections of the U-portion to the same height as the height of the solution in the chamber 17.

The upper end of the leg section of the U-portion 31 on the discharge side of port 32 is integrally joined to a return bend 33 having its open end 34 positioned above the chamber 17 so that excess solution may be returned directly to the solution chamber. The return bend 33 may be provided with a depending portion 36 providing a dispensing chamber 36a integrally formed therewith or connected thereto in any suitable manner. The inlet opening 37 to the dispensing chamber 36a is sufficient to rapidly admit solution to the dispensing chamber 36a to cause rapid filling thereof. The size and volume of the dispensing chamber 36a is preselected so that a desired amount of solution may be collected therein and dispensed through a discharge port 38 at the bottom of the dispensing chamber. It will be noted that the dispensing chamber 36a is positioned within the overflow stack 13, although it is understood that the dispensing chamber may be positioned over any portion of a liquid within a receptacle to which it is desired to add a selected solution.

It should be noted that the end portion of the return bend 33 is inclined at a slight angle so that after the dispensing chamber 36a is filled with fluid, any fluid remaining in the tube 30 and in the return bend will drain therefrom. It is also understood that chamber 36a need not be employed, if so desired, and solution may be dispensed to a liquid in a receptacle directly from open end 34 of tube 30. In this instance, the amount of fluid dispensed will depend upon the positioning of the intermediate U-portion in solution in chamber 17 so that when the solution within the U-bend of the tube finds its level, the amount within tube 30 will be a selected desired amount.

In order to prevent siphoning of solution from the chamber 17 into the receptacle 11 and thus dispense all of the solution which is capable of being admitted to the tube through the port 32, a vacuum-breaking or anti-siphon means 40 having a chamber 41 is provided between the inlet end of tube 30 and the solution-admitting port 32 and above the normal height of solution in U-portion 31. In this example, the anti-siphon means 40 may comprise an enlarged cylindrical section integral with the tube 30. The enlarged anti-siphon chamber 41 permits solution in the tube to accumulate therein and some air from the open end 34 to pass therethrough so that solution will not flow downwardly through the inlet end of tube 30, the connector fitting 26 and out the inlet port 27. Other anti-siphon devices may be employed.

Means for maintaining a selected level of solution in the chamber 17 in the event chamber 17 is required to be of small capacity many include an auxiliary supply tank 42 of any suitable size and construction secured to the wall of the flush tank or receptacle 11 in any convenient suitable manner. The tank 42 includes a threaded closure plug 44 in the bottom wall 45 of the tank. The plug 44 may be provided with a discharge bore or port 46. A tube 48 of selected length may be fitted within bore 46 in any convenient manner for communication with the solution in the tank. The discharge end of fill tube 48 may be positioned in selected spaced relation above the bottom of U-portion 31 so that solution in supply tank 42 may drain through the discharge port 46 into the tube 48 and into the solution chamber 17. A convenient manner of determining the position of the discharge end of tube 48 is to insert the other end of the tube through bore 46 until the tube is properly positioned, then remove the plug and cut off the excess portion of the tube extending into the tank. The tank may be filled by removing from the receptacle, turning upside down, removing plug 44, and then filling the tank with solution.

Figure 3:
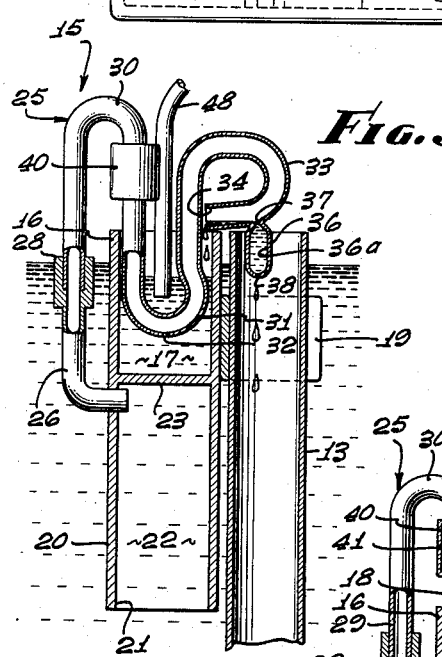
Fig. 3 is a partial elevational view, partly in section, of the device shown in Figs. 1 and 2 with the device discharging solution to the liquid in the water closet.
Figure 4:
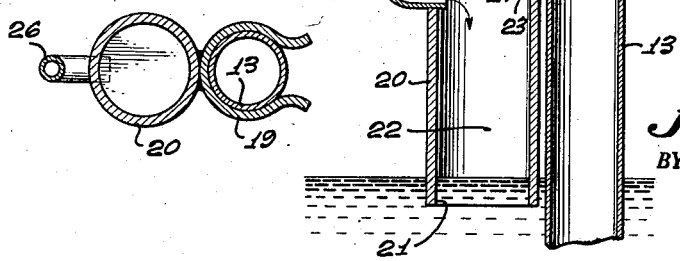
Fig. 4 is a transverse sectional view taken in the plane indicated by IV—IV of Fig. 2.

In operation of the automatic dispensing device of this invention, water in the flush tank and receptacle 11 normally is provided a level as seen in Fig. 1. In this condition of the flush tank, solution in chamber 17 may be at the level indicated in Fig. 3, said solution filling the lower section of the U-portion to the same level, said solution being admitted therethrough by port 32.

When the water closet is flushed by actuation of handle 50, the water in receptacle 11 is rapidly discharged through the valve assembly 12 into the toilet bowl. The level of the water in the tank drops below the opening 21 of the cylindrical extension 20. As the flushing operation is completed, the water in the receptacle commences to rise, being introduced into the receptacle 11 by action of the float valve 14. As the water level covers opening 21 and rises within pressure chamber 22, air trapped therein is placed under compression between the top surface of the water in the chamber and the top surface of the level of solution in the leg section of the U-portion on the inlet side of port 32. When the level of water rises to the partition wall, the air under compression between the two liquids causes the quantity of solution in the U-portion to move up the discharge leg section into and around the return bend 33. At the inlet opening 37 to the dispensing chamber 36 the solution divides, part entering the dispensing chamber until it is filled, and the remainder being discharged and returned through the discharge opening 34 into the solution chamber. The solution in the dispensing chamber drains through port 38 into the overflow pipe and into the water in the toilet bowl.

It will be noted that the pressure of air is able to continue pushing the slug of solution in the U-portion past the admitting port 32 because the admitting port is of restricted size and does not permit discharge of air in any appreciable quantity into the solution chamber. The slug of the solution is discharged from tube 30 and solution in chamber 17 is again admitted through the admitting port 32. Solution continues to enter the U-portion of the tube 30 until the solution liquid levels equalize.

This quantity of solution entering the U-portion is sufficient to lower the liquid level of the solution in chamber 17 below the discharge end of the fill tube 48.

Lowering of the solution level allows solution in tube 48 to then discharge by gravity into the solution chamber until the supply in the chamber 17 is replenished and the discharge end of tube 48 is again beneath the surface of the solution in chamber 17. During this solution replenishing operation, air is admitted in small bubbles upwardly through fill tube 48 into the tank 42 so as to eliminate the presence of a substantial vacuum above the liquid level in the supply tank 42.

The water in receptacle 11 will rise to a level controlled by the float valve 14 and in this condition the dispensing device of this invention is again ready to dispense an additional selected quantity of solution. The inlet port 27 of the tube means is closed by water and solution is in the lower section of the U-portion. To prevent withdrawal of solution from the U-portion and chamber 17 when the toilet is flushed the next time and the water level drops below inlet port 27 and creates a vacuum in the pressure chamber 22, the antisiphon means 40 is provided. As the water level rapidly drops the slug of solution in the U-portion is drawn upwardly into the chamber 41. The chamber 41 accommodates a substantial portion of this solution and air is drawn through the return bend and through the intermediate U-portion 31. Because the port 32 is relatively small, admission of solution thereto will not be great enough to interfere with the passage of air around the U-portion and then upwardly through the vacuum chamber 40 to prevent the solution from being drawn through the tube means to the inlet port 27. As soon as the water level has dropped below the cylindrical extension 20, air is admitted to the pressure chamber and the vacuum condition is destroyed. As a result, the air equalizes again the positioning of the solution in the intermediate portion 31 and the device is ready for further dispensing of solution as above described.

It will thus be readily apparent that a very simple, foolproof, inexpensive dispensing device for introducing selected amounts of liquid into a liquid-containing receptacle is provided by the exemplary embodiment of this invention explained above. The only necessary maintenance is that of keeping open the solution-admitting port 32 and the solution discharge port 38. Since the materials used are of a character which are not subjected to scale or corrosion, these ports will normally be open. If they should become clogged, they may be readily cleaned by disconnecting tube 30 from the connector fitting 26.

It will be understood that while the exemplary embodiment of this invention is described with respect to a water closet, the device is responsive to fluctuations of pressure in a fluid. In this example such fluctuations are caused by liquid level changes although such pressure variation may occur in various other devices. This device is readily employed wherever it is desired to introduce a preselected quantity of solution to a liquid in response to liquid level changes.

All modifications and changes coming within the scope of the appended claims are embraced thereby.

I claim:

1. A single, open ended tube means defining a continuous through passageway for dispensing selected quantities of liquid comprising: an inlet end portion having an inverted U section, one leg of the U section having an open inlet end adapted to communicate with a fluid pressure variation means, said other leg of the inlet U section being provided with means defining an enlarged chamber in said through passageway serving as anti-vacuum means; a discharge end portion including a return bend section having an open end to discharge liquid passed through said tube means; and an upright tube U portion interconnecting in communication the other leg of the inlet U section below said enlarged chamber and said discharge end portion, said upright U portion being provided with a port for communication with fluid to be dispensed.

2. A single, open ended tube means defining a continuous through passageway for dispensing selected quantities of liquid comprising: an inlet end portion having an inverted U section, one leg of the U section having an open inlet end adapted to communicate with a fluid pressure variation means, said other leg of the inlet U section being provided with means defining an enlarged chamber in said through passageway serving as anti-vacuum means; a discharge end portion including a return bend section having an open end to discharge liquid passed through said tube means; said return bend section having a dispensing chamber of preselected volume in communication therewith and provided with a port to discharge liquid from said dispensing chamber into an associated fluid to be treated, and an upright tube U portion interconnecting in communication the other leg of the inlet U section below said enlarged chamber and said discharge end portion, said upright U portion being provided with a port for communcation with fluid to be dispensed.

3. A single, continuous, open ended tube means defining an unobstructed continuous through passageway comprising: an inlet end tube portion provided with an open inlet end adapted to communicate with a pressure variation means, said inlet end portion being provided with means defining an enlarged chamber in said through passageway serving as anti-vacuum means; a discharge end tube portion provided with an open end to discharge liquid passing through said passageway; and an intermediate tube portion extending between said inlet portion and said discharge portion and interconnected therewith for fluid communication therebetween, said intermediate portion having a port for introducing to said passageway fluid to be dispensed.

References Cited in the file of this patent

UNITED STATES PATENTS

| | | |
|---|---|---|
| 1,498,100 | Hoyle et al. | June 17, 1924 |
| 1,728,737 | Stoner | Sept. 17, 1929 |
| 2,058,436 | Friel | Oct. 27, 1936 |
| 2,156,606 | Robertshaw | May 2, 1939 |
| 2,171,932 | Holmboe et al. | Sept. 5, 1939 |
| 2,275,607 | Bramming | Mar. 10, 1942 |
| 2,442,392 | Anderson | June 1, 1948 |
| 2,520,398 | Hanks | Aug. 29, 1950 |
| 2,688,754 | Willits et al. | Sept. 14, 1954 |
| 2,691,510 | Manville | Oct. 12, 1954 |

FOREIGN PATENTS

| | | |
|---|---|---|
| 597,267 | Great Britain | Jan. 22, 1948 |